United States Patent [19]

Tokumura et al.

[11] Patent Number: 5,231,861
[45] Date of Patent: Aug. 3, 1993

[54] METHOD OF PROCESSING BRAKE PADS FOR DISC BRAKES

[75] Inventors: Hiroshi Tokumura; Yukikazu Koyanagi; Toru Yoshino, all of Saitama, Japan

[73] Assignees: Akebono Brake Industry Co., Ltd., Tokyo; Akebono Research and Development Centre Ltd., Saitama, both of Japan

[21] Appl. No.: 795,870

[22] Filed: Nov. 21, 1991

[30] Foreign Application Priority Data

Nov. 22, 1990 [JP] Japan .................. 2-316184

[51] Int. Cl.$^5$ ............................ B21D 31/00
[52] U.S. Cl. ........................ 72/340; 188/250 G
[58] Field of Search .............. 156/267; 264/162, 266; 188/73.1, 250 B, 250 G; 72/340, 364

[56] References Cited

U.S. PATENT DOCUMENTS

| | | | |
|---|---|---|---|
| 2,727,845 | 12/1955 | Bishop | 188/250 G |
| 2,796,635 | 6/1957 | Harvender | 264/266 |
| 3,300,353 | 1/1967 | Hernick | 156/267 |
| 3,767,018 | 10/1973 | Gordon | 188/250 G |
| 4,569,424 | 2/1986 | Taylor, Jr. | 188/250 G |

*Primary Examiner*—Lowell A. Larson
*Attorney, Agent, or Firm*—Finnegan, Henderson, Farabow, Garrett & Dunner

[57] ABSTRACT

Method of processing brake pads having a lining member mounted on a back plate is disclosed. An exposed surface of the lining member initially having a substantially planar configuration is heated to a warping temperature between substantially 300° C. and substantially 800° C. to be permanently warped the brake pad into a substantially concave configuration. Then the exposed surface of the lining member is ground into a substantially planar configuration, while maintaining the warped condition of the brake pad.

3 Claims, 2 Drawing Sheets

METHOD OF PROCESSING BRAKE PADS FOR DISC BRAKES

BACKGROUND OF THE INVENTION

1. Field of the Invention

The present invention relates to a method of processing brake pads for disc brakes.

2. Description of the Prior Art

Disc brakes are commonly utilized in automobiles and manufacturing machinery. Unfortunately, disc brakes are often the source of undesirable and excessive noise which contributes to noise pollution as a whole with harmful effects on our environment.

Many studies have been performed on disc brakes and their operation to determine the cause of noise generation. One such cause has been determined to be a result of warpage of the brake pad during braking operation.

With initial reference to the drawings, FIG. 4 presents an exaggerated side view of a warped brake pad 3 in operation. The conventional brake pad is formed by bonding a lining member 2 to a back plate 1. Ideally, the lining member 2 should have a planar surface for flush engagement with a planar surface of a rotor 4.

In operation, the lining member 2 of the brake pad 3 is forcibly pressed against the surface of the rotor 4. A frictional force between the lining member 2 and the rotor 4 prevents any subsequent rotation until the brake pad 3 is released from the rotor 4. In this manner, activation of a disc brake can decelerate a speeding automobile or secure operation of hazardous machinery during repair operations.

In actuality, however, the lining member 2 is frictionally heated each time the disc brake is activated. The lining member 2 deforms due to its own material characteristics, such that the brake pad 3 is warped into a concave configuration, as demonstrated in FIG. 4. This deformed concave configuration results in at least two detrimental effects. First, the concave configuration of the brake pad only permits the peripheral edge of the lining member 2 to engage the rotor 4. Since it is intended that substantially the entire surface of the lining member 2 be capable of pressing against the surface of the rotor 4 to obtain the prescribed frictional force of the brake, the substantially reduced surface area contact between the lining member 2 and the rotor 4 results in the braking capacity of the disc brake being severely diminished. Likewise, the edge-type contact between the peripheral edge of the lining member 2 and the rotor 4 typically results in the generation of undesirable noise.

SUMMARY OF THE INVENTION

The present invention has been made in view of the above circumstances and has as a general object of providing a method of processing a brake pad which does not make any noise in operation.

An additional object of the present invention is to provide a method of processing a brake pad which retains its prescribed braking capacity.

A further object of the present invention is to provide a method of processing a brake pad from a brake pad having a lining member and a back plate.

Another object of the present invention is to provide a method of processing a brake pad which maintains a substantially planar surface during operation for uniform contact with a planar surface of a rotor.

Additional objects and advantages of the invention will be set forth in part in the description which follows, and in part will obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention includes a method of processing a brake pad from a conventional brake pad having a lining member mounted on a back plate with an exposed surface of the lining member initially of a substantially planar configuration. The processing method includes the steps of warping the brake pad into a deformed condition with the exposed surface of the lining member having a substantially concave configuration; and grinding the exposed surface of the lining member into a substantially planar configuration, while maintaining the warped condition of the brake pad. As further embodied herein, the warping step may include heating the exposed surface of the lining member to a warping temperature of at least about 300° C. to be permanently warped the lining member into a substantially concave configuration; and cooling the lining member to permit grinding of the exposed surface.

Alternatively, and as broadly described herein, the present invention also includes a method of processing a brake pad first comprising the step of assembling a brake pad to include a lining member mounted on a back plate with an exposed surface of the lining member initially having a substantially planar configuration. The assembling step embodied herein includes selecting a substantially planar lining member and back plate; applying a layer of adhesive between the two; and curing the layer of adhesive to securely affix the lining member to the back plate. Likewise, the assembling step may further include subjecting the brake pad to a heat treatment temperature between about 250° C. and about 300° C. to stabilize the material characteristics of the lining member; and smoothing the exposed surface of lining member. With the brake pad assembled, the processing method further includes the warping step and the grinding step of the processing method outlined above.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1A:
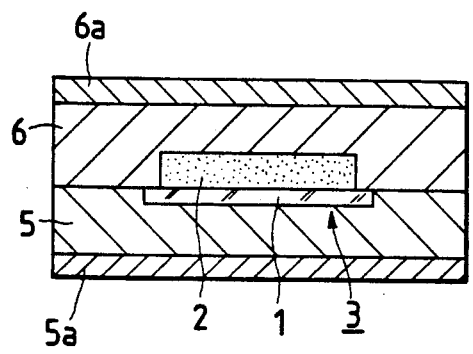
FIGS. 1(a) through 1(e) are diagrams demonstrating the method steps of processing brake pads according to the present invention.

Reference will now be made in detail to the present preferred embodiment of the invention, an example of which is illustrated in the accompanying drawings. Wherever possible, the same reference numbers will be used throughout the drawings to refer to the same or like parts.

In accordance with the present invention, the method of processing a brake pad for a disc brake includes a series of steps to ensure the brake pad maintains a substantially planar surface for uniform contact with a planar surface of a rotor. Generally, the processing method of the present invention first involves the step of assembling a brake pad which includes a lining member mounted on a back plate with an exposed surface of the lining member initially having a substantially planar configuration. The processing method further includes, and the method of processing a brake pad generally encompasses, the steps of warping the brake pad into a condition with the exposed surface of the lining member having a substantially concave configuration; and grinding the exposed surface of the lining member into a substantially planar configuration, while maintaining the warped condition of the brake pad.

It is noted that the processing method of the present invention may be performed on various existing brake pad configurations. That is, the processing method of the present invention does not require that the brake pad be processing in accordance with the assembly step of the processing method described in detail below. However, in accordance with the processing method of the present invention, the brake pad to be processed includes a lining member mounted on a back plate with an exposed surface of the lining member initially having a substantially planar configuration.

As embodied herein, the method of processing a brake pad, generally designated by reference character 3, is schematically presented in a sequential manner by FIGS. 1(a) through 1(e). Similarly, FIGS. 1(d) and 1(e) also schematically present the processing method of the present invention. With initial reference to FIG. 1(a), the assembly step of the processing method includes mounting a lining member 2 on a back plate 1 with an exposed surface of the lining member 2 initially having a substantially planar configuration.

In the preferred embodiment of the present invention, both the lining member 2 and the back plate 1 selected for assembly are substantially planar, as best seen in FIG. 1(a). The lining member 2 selected has a front and back surface, and mounting of the lining member 2 on the back plate 1 is performed by applying a layer of adhesive between the back plate 1 and a back surface of the lining member 2; and curing the layer of adhesive to securely affix the lining member 2 to the back plate 1.

In the preferred embodiment, and as demonstrated in FIG. 1(a), curing is performed by placing the combined structure of the lining member 2 and the back plate 1 in a hot press. The combined structure is sandwiched between the lower member 5 and upper member 6 of the hot press. In operation, the lower and upper members 5, 6 are pressed together and heated by heating plates 5a and 6a, respectively. In this manner, the layer of adhesive is perfectly hardened, thereby stabilizing the physical characteristics of the lining member 2 and bonding the lining member 2 to the back plate 1 to form the brake pad 3. As evidenced in FIGS. 1(a) and 1(c), the front surface of the lining member 2 thus defines the substantially planar exposed surface of the lining member 1.

As embodied herein, the assembly step of the processing method further includes heat treating the brake pad 3 to further stabilize the lining member 2. The heat treatment embodied herein includes subjecting the brake pad 3 to a heat treatment temperature to stabilize the material characteristics of the substantially planar lining member 2; and smoothing the exposed surface of lining member 2 to remove residue and ensure a substantially planar configuration is maintained.

Figure 1B:
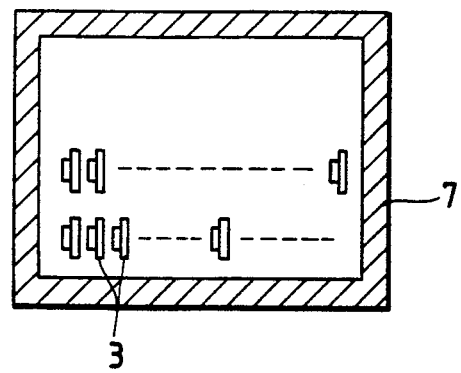
Figure 1C:
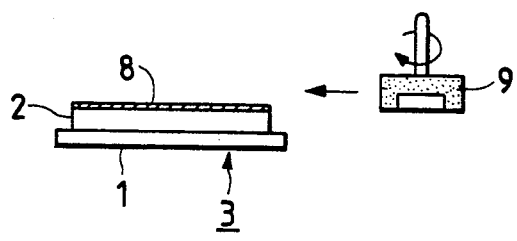
Figure 1D:
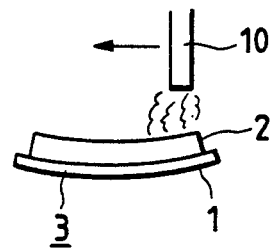
Figure 1E:
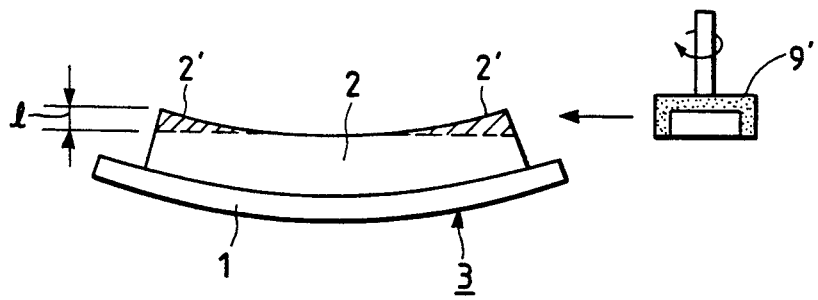
Figure 4:
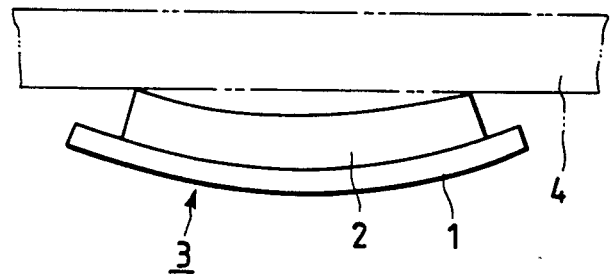
FIG. 4 is an exaggerated side view of a conventional brake pad in a warped condition in operation.

In the preferred embodiment of the heat treatment shown in FIG. 1(b), a plurality of brake pads assembled in accordance with the method step described above are placed in an oven 7. The oven subjects the brake pads to a heat treatment temperature between about 250° C. and 300° C. to stabilize the material characteristics the lining member 2. As a result of the heat treatment, and as best seen in FIG. 1(c), a black covering or residue 8 typically forms on the exposed surface of the lining member 2. Therefore, the assembly step further includes smoothing the exposed surface of lining member 2 to remove the residue 8 and ensure the exposed surface maintains a substantially planar configuration. Preferably, the smoothing is performed by a grinder 9, as seen in FIG. 1(c).

As previously mentioned and in accordance with the present invention, the processing method further includes, and the processing method generally encompasses, the steps of warping the brake pad into a condition with the exposed surface of the lining member having a substantially concave configuration; and grinding the exposed surface of the lining member into a substantially planar configuration, while maintaining the overall warped condition of the brake pad.

As embodied herein, the warping step is performed by heating the exposed surface of the lining member 2 to a warping temperature to be permanently warped the lining member 2 into a substantially concave configuration. In the preferred embodiment of the warping step, demonstrated in FIG. 1(d), the exposed surface of the lining member 2 is heated by a burner 10. As a result, both the back plate 1 and the lining member 2, which are bonded together to make up the brake pad 3, deform when the desired warping temperature is reached. More specifically, the brake pad 3 is warped or curls into a concave configuration, with the peripheral edge 2' of the lining member 2 raised relative to the central portion of the lining member.

It is noted that the direct application of heat to the lining member may result in deterioration of the exposed surface. However, this deterioration is limited only to the surface of the lining member, and neither the strength of the lining member as a whole nor the bonding capacity of the adhesive is adversely affected. Further it is noted that the desired warping temperature is at least about 300° C.; and preferably between about 300° C. and about 800° C., as will be discussed in greater detail below.

After permanent warpage occurs, the lining member 2 is cooled to permit grinding of the exposed surface. As embodied herein, and shown in FIG. 1(e), grinding of the exposed surface is performed by the grinder 9'. More specifically, the grinder 9' removes the raised peripheral edge 2' of the lining member 2 to provide the exposed surface of the lining member with a substantially planar configuration while the warped condition of the brake pad 3 is maintained. In this manner, the exposed surface of the lining member 2 processed in accordance with method of the present invention does not further warp when in operation on a disc brake or the like, regardless of repeated braking operation. As such, undesirable noise generation and reduction of braking capacity are effectively eliminated.

The invention will be further clarified by the following examples, which are intended to be purely exemplary of the invention.

Figure 2:
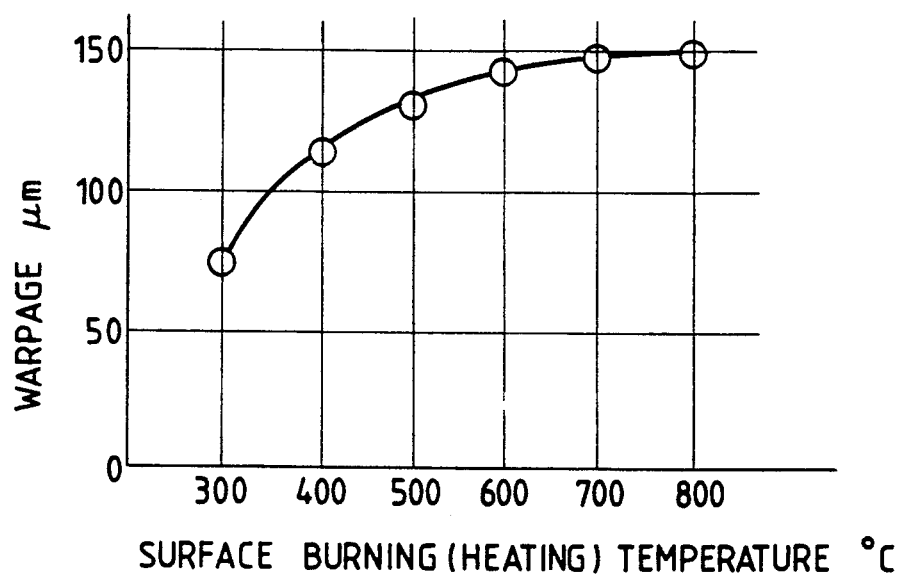
FIG. 2 is a line graph presenting a relationship between the warping temperature of the lining member and the extent of resulting warpage.

With reference to the drawings, FIG. 2 is a line graph presenting a relationship between the warping temperature of the exposed surface of the lining member and the extent of resulting warpage. It is noted that the extent of resulting warpage is the measured distance between the undeformed central portion of the exposed surface and the deformed raised peripheral edge of the exposed surface, as denoted by "[insert cursive l]" in FIG. 1(e). As evident in FIG. 2, the total extent of warpage increases with increasing warping temperature of the exposed surface of the lining member.

There are two methods of heating the exposed surface of the lining member. One of the methods is realized in that a pad is sandwiched between a press and a hot plate. The other is realized in that a pad is mounted on a belt or the like and conveyed with a conveyer while being heated with propane gas. The pad is sufficiently warped by the both methods. The warpage of the pad is gauged by measuring the vertical section of the heated surface of the pad with a surface-coarse measure.

Figure 3:
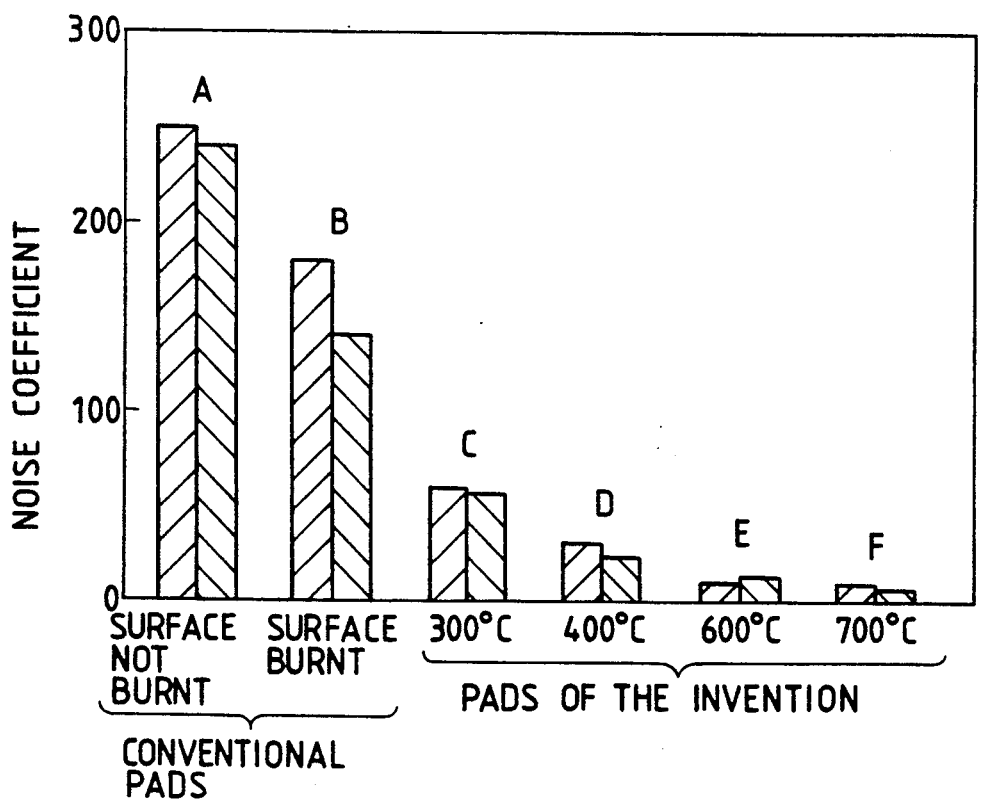
FIG. 3 is a bar graph presenting the noise coefficient of conventional brake pads in comparison with the noise coefficient of the brake pads made in accordance with the present invention.

FIG. 3 is a bar graph presenting the noise coefficient of conventional brake pads in comparison with the noise coefficient of brake pads made in accordance with the present invention. In performance of the noise evaluation depicted in FIG. 3, pairs of the brake pads were used. Example A in the bar graph designates a pair of conventional brake pads which were untreated; and Example B designates a pair of conventional brake pads in which the surfaces were merely heated. Alternatively, Example C represents a pair of brake pads in which its exposed surfaces were heated to about 300° C. and ground in accordance with the present invention. Likewise, Example D represents a pair of brake pads in which the exposed surfaces were heated to about 400° C. and ground; Example E designates a pair of pads heated to about 600° C. and ground; and Example F designates a pair of pads heated to about 700° C. and ground.

Noise coefficient is calculated by the following equation.

$$\text{Noise coefficient} = X_1 + 3X_2 + 10X_3 + 30X_4 + 100X_5$$

The character of $X_n$ ($n=1, 2, 3, 4, 5$) is given by (number of times of noise generation) / (number of times of the braking operation)$\times 100$ and represents noise generation ratio (%) in each sonic pressure level.

Each of the coefficient of $X_n$ represents a Weighing coefficient. The more uncomfortably a man feels when he hears the noise, the larger these numbers are set.

As seen in FIG. 2, the percentage of change in the total extent of warpage is minimal beyond 700° C., and is substantially unchanging beyond 800° C. As such, the noise evaluation of FIG. 3 was only performed to 700° C. Further, the permanent warpage of the brake pad due to the warping step of the present invention eliminates future warping of the brake pads, as well. In essence, the elimination of future warping likewise eliminates the risk of undesirable noise generation and diminished braking capacity.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of processing a brake pad for a disc brake including a lining member mounted on a back plate with an exposed surface of said lining member initially having a substantially planar configuration, the method comprising the steps of:
    heating said exposed surface of said lining member to warp said lining member into a substantially concave configuration; and
    grinding said exposed surface of said lining member into a substantially planar configuration, while maintaining the warped condition of said brake pad.

2. The method of claim 1, wherein said warping temperature is more than substantially 300° C.

3. The method of claim 1, wherein said warping temperature is between substantially 300° C. and substantially 800° C.

* * * * *

UNITED STATES PATENT AND TRADEMARK OFFICE
CERTIFICATE OF CORRECTION

PATENT NO. : 5,231,861
DATED : August 03, 1993
INVENTOR(S) : Hiroshi Tokumura et al.

It is certified that error appears in the above-indentified patent and that said Letters Patent is hereby corrected as shown below:

Claim 1, column 6, line 35, delete "with an exposed surface of" and insert --,--.

Claim 1, column 6, line 36, before "initially" insert --being heat cured and --and after having insert --an exposed surface of--.

Signed and Sealed this

Nineteenth Day of July, 1994

Attest:

BRUCE LEHMAN

Attesting Officer

Commissioner of Patents and Trademarks